United States Patent
Bjelland et al.

[15] 3,690,780
[45] Sept. 12, 1972

[54] VACUUM ACTUATED ROTARY DRILL

[72] Inventors: John Louis Bjelland, Glen Head; Floyd W. Flynn; Norman C. Schutt, both of Glen Cove, all of N.Y.

[73] Assignee: Powers Chemco, Inc., Glen Cove, N.Y.

[22] Filed: Feb. 26, 1971

[21] Appl. No.: 119,193

Related U.S. Application Data

[63] Continuation-in-part of Ser. No. 853,835, Aug. 28, 1969, abandoned.

[52] U.S. Cl. ..................408/58, 51/235, 83/374, 83/451, 279/3, 352/130, 408/130
[51] Int. Cl. ..................B23b 41/00, B23b 47/22
[58] Field of Search ........408/58, 129, 130; 352/130; 279/3; 83/374, 451; 51/235

[56] References Cited

UNITED STATES PATENTS

| | | | |
|---|---|---|---|
| 2,151,822 | 3/1939 | Winchester | 408/129 X |
| 3,472,101 | 10/1969 | Tanaka | 408/58 |
| 1,997,843 | 4/1935 | Warrell | 408/58 X |

Primary Examiner—Francis S. Husar
Attorney—Morgan, Finnegan, Durham & Pine

[57] ABSTRACT

A motor-driven hollow drill member having a cylindrical bit or cutting edge to engage a sheet of photographic film or the like is rotationally and slidably supported in a housing connected to a vacuum pump by apertures communicating with the exterior and interior of the hollow drill. The bit end of the drill may protrude from one end of the housing which is adapted to be brought into vacuum contact with a sheet film. Upon the drill housing making contact with the film, the film is drawn into firm contact with the drill assembly and the bit is pneumatically urged into contact with the film to drill an accurate hole therein. As soon as the hole has been drilled, the vacuum is destroyed, the cut-out disc is sucked through the drill and the drill assembly is released from the surface of the film.

The drill assembly finds its primary field of usefulness in the formation of register holes in one or more margins of a sheet of film being processed in a photomechanical camera as the first step in preparing a preregistered printing plate.

5 Claims, 7 Drawing Figures

Patented Sept. 12, 1972

INVENTORS
JOHN LOUIS BJELLAND
FLOYD W. FLYNN
BY NORMAN C. SCHUTT
Morgan, Finnegan, Durham & Pine
ATTORNEYS

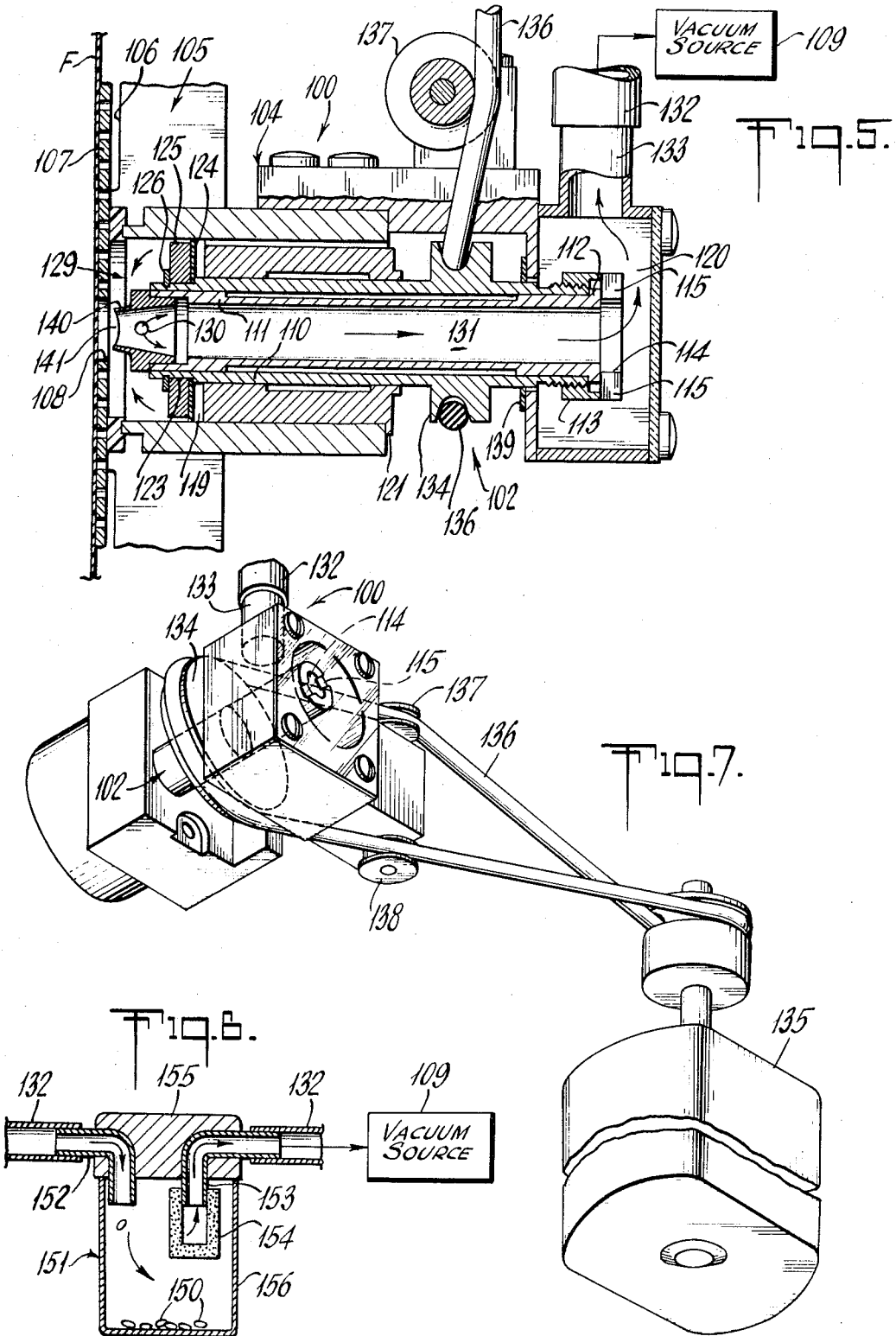

VACUUM ACTUATED ROTARY DRILL

This application is a continuation-in-part of application Ser. No. 853,835, filed Aug. 28, 1969 and now abandoned.

BACKGROUND OF THE INVENTION

1. Field of the Invention

The present invention relates generally to rotary drills of utility especially in the formation of register holes in a sheet of photographic film being processed in a photomechanical camera and relates more particularly to a novel and improved vacuum actuated rotary drill which accurately cuts the register holes in the film and does not require a backing member or the application of positive pressure to the drill in order to cut through the film.

2. Description of the Prior Art

In order to provide for pre-registration of photoengraving and other photomechanical printing plates, means have heretofore been provided in the photoengraving camera for punching widely spaced register holes in a marginal portion of the photographic film; usually two widely spaced holes along one edge of the film, which register holes thereafter control the positioning of the film and the printing plate or plates made therefrom. These register holes have been formed by punch and die members forming an integral part of the camera and requiring elaborate installation, with the punch members being carried on the camera back while the die members are mounted in the vacuum board. Such an apparatus requires very careful and precise installation for the widely spaced punches and dies, which must mate perfectly if precision register is to be achieved.

More recently, it has been proposed to use hollow rotary drills to form the register holes in the film, and while this avoids the troublesome problem of precise mating of punches and dies, it does not provide a practical solution to the problem, as the use of a rotary hollow drill must fully penetrate the film sheet supported against a backing member, and either the backing member is cut away, providing trash and other dust and with dulling of the cutting edge of the hollow drill, or the register hole is not completely cut through the film sheet.

3. Objects of the Invention

It is therefore an object of this invention to provide new and improved means for forming register holes in a sheet of photographic film being processed in a photomechanical camers.

Another object of this invention is to provide a new and improved vacuum activated rotary drill which overcomes the disadvantages of the punch-and-die mechanisms and rotary drills previously used to form register holes in photographic film.

Another object of this invention is to provide a new and improved vacuum actuated rotary drill which will cut a hole in photographic film or other desired material with precision without requiring elaborate installation apparatus.

Another object of this invention is to provide a new and improved vacuum activated rotary drill which does not require a backing member or the application of positive pressure to the drill for the cutting or drilling operation.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the vacuum actuated rotary drill of the present invention includes a housing member within which is rotatably mounted a driven hollow rotary drill having a cutting edge on its forward end. The drill has limited axial movement within its housing. Suction means are provided to create a partial vacuum within the housing and the hollow drill is provided with openings so that the suction may also be applied to its hollow interior.

In a first embodiment, the drill housing is provided at its forward end with a perforated plate which provides communication with the interior of the housing, and is also apertured to allow the drill to protrude therethrough. The perforated plate is surrounded by a solid portion of the housing to prevent leakage of air into the housing from the sides thereof.

When the forward end of the drill housing is brought into approximate contact with a sheet of film in a camera, or elsewhere, the sheet of film is drawn forcefully by suction against the perforated plate and the hollow drill is drawn into contact with the film against the pressure of a retracting spring. As the drill rotates, its bit end cuts into the film, and when it has cut through the film, air leaks into the hollow drill, thereby destroying the suction and allowing the spring to retract the drill, while the cut-out plug is carried back by suction through the drill and into the suction tube supplying vacuum to the drill.

In a second embodiment, the drill housing has a cylindrically-shaped, open front cavity which carries a bearing assembly in which the drill is journalled for rotation and limited axial travel. The drill includes an annular sealing disc located behind the drill bit and in front of the bearing assembly so that the drill may slide in sealing engagement with the housing wall surrounding the front cavity. Upon contacting the front end of the housing in sealing engagement with the rear surface of a vacuumboard holding a sheet of film or the like thereon, a front vacuum chamber is formed in the housing cavity between the film and the sealing disc of the drill. The rear end of the hollow drill is open and terminates in a rear vacuum chamber provided in the drill housing. A suitable opening in the drill bit communicates the front vacuum chamber with the rear vacuum chamber by means of the hollow interior of the drill. The drill is normally held in a retracted position by pressure-biasing the motor-driven belt against the rear side of the drill pulley.

In operation, similarly to the first embodiment, when the forward end of the drill housing is brought into vacuum contact with a vacuumboard holding a sheet of film thereon, the sheet of film is held forcefully by suction on the vacuumboard over an aperture adapted to telescopically receive the drill bit therethrough. The hollow drill is similarly forcefully drawn into contact with the film by the force of the atmospheric pressure operating against the back side of the drill sealing disc, whereupon the film is severed by the drill bit and the vacuum is destroyed.

The tabs or plugs severed from the film are carried by suction out of the drill and advantageously are collected in a container provided in the conduit connecting a vacuum source to the drill housing.

As preferably embodied, the circumferentially extending cutting edge of the drill bit is provided with symmetrical concave recesses in each half-section so that the drill bit cuts along continuously moving points, in a shearing action.

It will thus be seen that the disadvantages of the prior art structures for forming register holes are completely avoided by the drill of the present invention, which draws the photographic film towards the drill and the drill towards the film until the register hole has been cut, at which time the film is released and the drill is automatically retracted.

Additional advantages are found in the preferred construction of the second embodiment, wherein the drill bit is shaped so as to cut through the film with a shearing action, rather than by punching. Also, the provision of front and rear vacuum chambers in the drill housing, in communication with each other by means of the hollow shaft of the drill, results in a greater surface area on the drill assembly for the vacuum to operate against, whereby the axial movement of the drill has greater force. By mounting the open rear end of the drill in the rear vacuum chamber of the drill housing, the severed portions of the film may be continuously sucked completely out of the drill assembly and collected in a separate container for ease of cleaning. Finally, the provision of front and rear vacuum chambers in the housing assembly separated by an open cavity permits the drill to be biased in its retracted position by tensioning the belt drive for the drill against the side of the pulley, eliminating the requirement of springs for this purpose.

It will be understood that the foregoing general description and the following detailed description as well are exemplary and explanatory of the invention but are not restrictive thereof.

The accompanying drawings, referred to herein and constituting a part hereof, illustrate the preferred embodiments of the invention, and together with the description, serve to explain the principles of the invention.

BRIEF DESCRIPTION OF THE DRAWINGS

FIG. 5 is a longitudinal sectional view, partly fragmentary and partly in elevation, of a second embodiment of a vacuum actuated rotary drill constructed in accordance with the present invention, the view illustrating the drill in its normal, retracted position with the bit end of the drill located immediately behind a perforated vacuumboard surface holding a sheet of photographic film or the like thereon;

FIG. 6 is a sectional view, partly fragmentary and partly schematic, illustrating the collecting mechanism for the pieces of film cut from the film sheet by the drill shown in FIG. 5; and FIG. 7 is a perspective view of the rotary drill shown in FIG. 5, illustrating the motor and pulley arrangement for driving the drill shaft.

DESCRIPTION OF THE PREFERRED EMBODIMENTS

Figure 1:
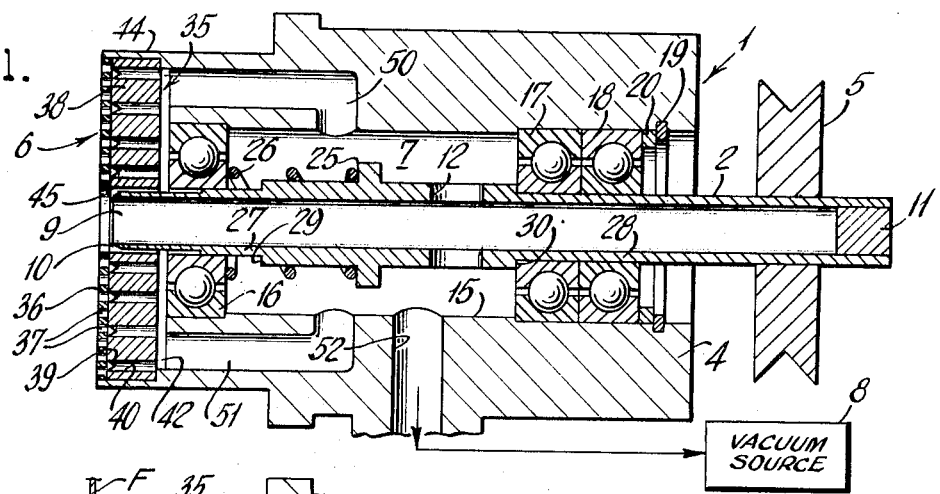
FIG. 1 is a longitudinal sectional view of a vacuum actuated rotary drill constructed in accordance with the present invention, the view illustrating the drill in its normal, spring-pressed return position with the bit end of the drill located immediately beneath the film contact surface of the drill housing.

Referring now more particularly to the embodiment of the invention shown in FIGS. 1–4 of the accompanying drawings, there is illustrated a vacuum actuated rotary drill, designated generally by reference numeral 1, having a hollow drill shaft 2 journalled for rotation within a housing 4 and rotated by a suitable motor-driven pulley 5. Housing 4 includes a film contact surface at the forward end thereof and internal cavity means, indicated generally by reference numerals 6 and 7, respectively, the latter communicating the film contact surface of the housing with a source of vacuum 8. Film contact surface 6 is thus adapted to firmly hold a flat sheet of photographic film F on the face thereof upon the application of vacuum to the housing 4, as is more fully described hereinafter.

As embodied in FIGS. 1–4, the hollow drill shaft 2 has an open end 9, which is advantageously bevelled so as to provide a cylindrical bit or cutting edge 10, and a sealingly closed end 11 adjacent pulley 5. A transverse borehole 12, located intermediate the drill shaft ends 9 and 11, provides an air passageway to the interior of drill shaft 2, for reasons more fully described hereinafter.

Drill shaft 2 is journalled for rotation, as well as for limited axial travel, in suitable anti-friction bearings carried in a generally cylindrical, axially extending internal chamber 15 of housing 4. Advantageously, a single bearing 16 is seated in and carried by a complementary bearing recess formed in the forward portion of chamber 15 and a pair of bearings 17,18 are seated in and carried by complementary bearing recesses formed in the rearward portion of the chamber. Front bearing 16 is held in its recess by the manifold 42 of the perforated vacuum distributing plate assembly 35, more fully described hereinafter, and the rear bearings 17,18 are held in their recesses by retaining ring 19 and a suitably sized spacing shim 20.

In accordance with the invention, retracting means are provided for normally locating the rotary drill in a return position within the drill housing, whereat the cutting bit of the drill is located immediately beneath the film contact surface of the drill housing.

To this end, in the embodiment shown in FIGS. 1–4, there is provided an annular bearing flange 25, formed by an enlarged diameter portion of the drill shaft intermediate the ends thereof. A compression spring 26 surrounds drill shaft 2 and bears against flange 25, thereby biasing the drill to its retracted position, shown in FIG. 1.

Forward and rear reduced diameter portions 27,28, respectively, of the drill shaft form respective forward and rear shoulders 29,30, which serve as stops to limit the axial travel of the drill.

As previously mentioned, housing 4 includes a film contact surface 6 at its forward end which is adapted to firmly hold a flat sheet of photographic film or the like on the face thereof by application of a vacuum to the housing. To this end, there is provided a vacuum distribution plate assembly 35 which includes a smooth, flat face plate 36 having a plurality of closely spaced, small-diameter openings 37 formed over the entire surface thereof. Overlying the back of face plate 36 and in intimate contact therewith is an intermediate plate 38 having a plurality of radially spaced, concentric channel grooves 39 communicating with openings 37. Plate 38 is also provided with circumferentially spaced boreholes 40 which provide air passageways between grooves 29 and a manifold 42. It will be apparent from the foregoing that assembly 35 provides a substantially uniform distribution of vacuum over the entire film contact surface 6.

The vacuum distribution plate assembly 35 is suitably sealingly mounted within a circumferentially extending rim 44 provided at the forward end of housing 4 so as to prevent leakage of air into the housing along the sides of the assembly. Assembly 35 also is provided with a central aperture 45 adapted to telescopically slidably receive the rotating bit end 9 of drill shaft 2 therein.

In accordance with the invention, internal cavity means are provided in the drill housing for communicating the film contact surface of the housing with a source of vacuum. As embodied in the construction of FIGS. 1–4, this cavity means includes the previously mentioned cylindrical, axially extending chamber 15, and additionally includes a pair of lateral passageways 50,51 extending generally parallel to chamber 15, communicating the manifold 42 of the vacuum distribution plate assembly 35 to chamber 15, and a further conduit 52, connecting vacuum source 8 to chamber 15.

Figure 2:
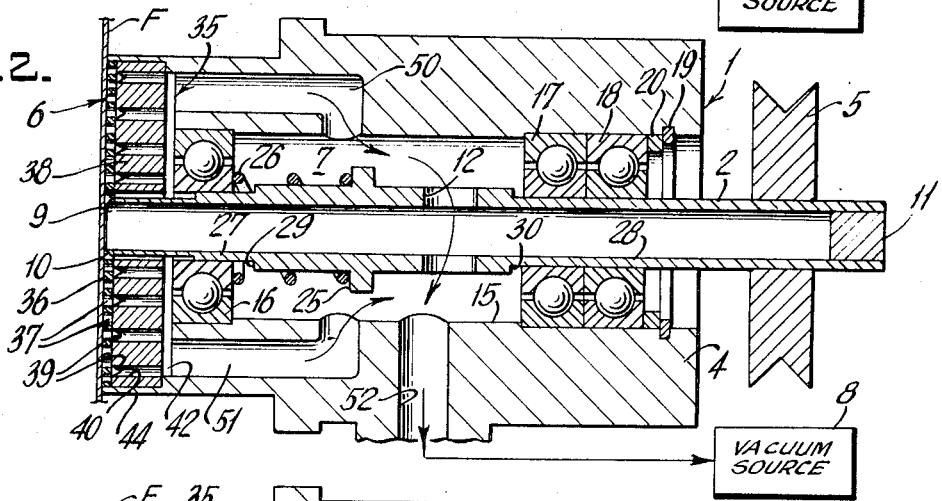
FIG. 2 is a longitudinal sectional view, showing the vacuum actuated rotary drill as embodied in FIG. 1 immediately after a source of vacuum has been applied to the drill housing, the view illustrating a flat sheet of photographic film firmly secured to the drill housing by suction, and further showing the drill pneumatically drawn forwardly into contact with the film sheet by reason of the vacuum which is applied to the inside of the drill shaft.
Figure 3:
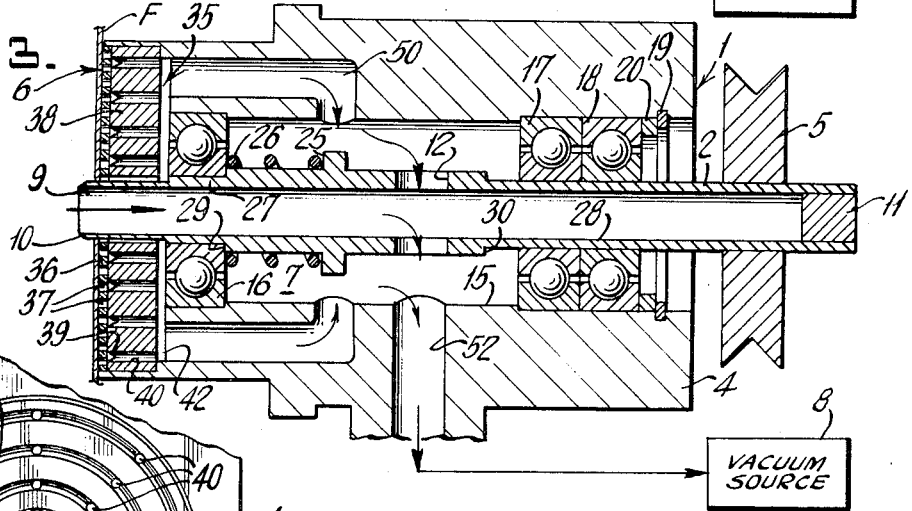
FIG. 3 is a longitudinal sectional view showing the vacuum actuated rotary drill as embodied in FIG. 1 after the drill bit has cut through the film sheet to form a register hole therein and, at the same time, leaving the drill free to be spring-driven to its normal return position.
Figure 4:
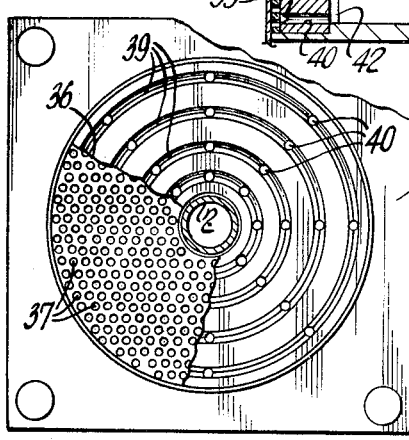
FIG. 4 is a fragmentary view in front elevation of the vacuum actuated rotary drill as embodied in FIG. 1, with a portion of the film contact surface broken away to show the details of the vacuum distribution plate communicating the film contact surface of the drill housing with the vacuum source.

With the foregoing description in mind and with particular reference to FIGS. 2 and 3 of the drawings, it will be apparent that the operation of the vacuum actuated rotary drill of the invention is as follows.

With the rotatably driven drill retracted in its normal return position, the film contact surface 6 of the housing 4 is placed adjacent a sheet of photographic film F or the like and a vacuum is applied to the housing 4 through conduit 52 from vacuum source 8. The vacuum is communicated through inner chamber 15 of housing 4 to the interior of the drill shaft 2 by transverse borehole 12, and also to the film contact surface 6 by lateral passageways 50,51 and the vacuum distribution plate assembly 35. In this manner, the sheet of film F is drawn forcefully by suction against the film contact surface 6 and the hollow drill is also pneumatically urged into contact with the film against the pressure of retracting spring 26. As the drill shaft 2 simultaneously rotates and travels axially into contact with the film, its bit end 9 cuts into the film. When the drill has cut through the film, air leaks into the hollow drill shaft, thereby destroying the suction and allowing the compression spring 26 to retract the drill to its normal return position, while the cut-out plug of film is carried back by suction through the hollow drill shaft and into the suction conduit supplying vacuum to the drill housing.

Referring now more particularly to the alternative embodiment of the invention shown in FIGS. 5–7 of the accompanying drawings, the vacuum actuated rotary drill is designated generally by reference numeral 100 and includes a hollow, cylindrical drill assembly 102 journalled for rotation as well as for limited axial travel in housing 104.

Advantageously in this embodiment, a vacuumboard, indicated generally by reference numeral 105, in known manner communicates a source of vacuum (not shown) through a manifold 106 to the suitably perforated vacuumboard surface 107 to hold a sheet of photographic film F or the like thereon. The vacuumboard surface 107 includes an opening 108 adapted to telescopically receive the bit end of the drill assembly 102 therethrough, more fully described hereinafter. The forward end of housing assembly 104 is adapted to sealingly engage the back side of vacuumboard surface 107 and thereupon communicates a source of vacuum 109 through the drill and housing assemblies to the film surface F.

As embodied in FIGS. 5–7, drill assembly 102 includes an outer cylindrical sleeve 110 having a drill shaft 111 slidably received therein. Drill shaft 111 is provided with a circumferentially extending rim 112 at its open, rear end which overlies the corresponding end of outer sleeve 110. A retainer nut 113 threaded onto outer sleeve 110 bears against rim 112 so as to fixedly removably retain drill shaft 111 within outer sleeve 110. The top of retainer nut 113 is provided with a circular opening 114 in registry with the open end of the drill assembly 102 and is suitably notched at 115 for receiving a screwdriver or the like, to provide a means for tightening the retainer nut onto sleeve 110.

Drill assembly 102 extends between a generally cylindrical open front cavity 119 and a rear vacuum chamber 120 in housing 104, and is journalled for both rotation and limited axial travel in suitable anti-friction bearing assemblies 121 carried in front cavity 119. Outer sleeve 110 includes a reduced diameter portion 123 spaced forwardly of bearing assembly 121, which carries in sliding, sealing engagement with the housing wall forming cavity 119 a washer 124 supported by disc 125 and held in place by retainer ring 126. Washer 124 may suitably be formed from plastic or other material equivalent thereto.

As more fully described hereinafter, upon housing 104 being brought into sealing engagement with the vacuumboard surface 107 holding a sheet of photographic film F or the like thereon, there is formed a front vacuum chamber 129 between the film F and sealing washer 124 in the cavity 119. A borehole 130 located in the forward end 122 of drill shaft 111 communicates the interior 131 of the drill assembly 102 with the front and rear vacuum chambers 129,120, respectively, of the housing assembly 104. Rear vacuum chamber 120, in turn, communicates with a source of vacuum 109 by means of hose 132 secured to outlet conduit 133 extending from chamber 120.

Outer sleeve 110 of the drill assembly 102 includes a pulley member 134, located between front cavity 119 and the rear vacuum chamber 120 of housing 104 and driven by a suitable motor 135 by means of belt 136. Advantageously, belt 136 travels over idler rollers 137,138 arranged so that the belt serves to pressure-bias the drill assembly toward its normal, retracted position, as illustrated in FIG. 5.

Finally, outer sleeve 110 of drill assembly 102 also includes a suitable rear sealing disc 139, which operates to seal the rear vacuum chamber 120 closed when drill assembly 102 is in its retracted position.

As preferably embodied and as illustrated in FIG. 5, the forward, bit end 140 of drill shaft 107 is tapered and its circumferentially extending cutting edge 141 is provided with symmetrical concave portions on each semi-circular section thereof. It will thus be seen that drill bit 140 cuts with a shearing action at continuously moving points along the cutting edge 141.

Also as preferably embodied, means is provided for collecting the circular tabs or plugs 150 cut from the film F by the drill assembly 102. To this end, as shown in FIG. 6, there is provided a container 151 having inlet and outlet conduits 152, 153, respectively, connected to vacuum hose 132. A filter device 154 secured to the inner end of outlet conduit 153 prevents the tabs 150 from being sucked out of container 151, and they are thus collected in the bottom of the container.

Advantageously, container 151 includes a cap member 155, in which the inlet and outlet conduits are mounted, to which there is removably FIGS. 5–7 by threading or the like, a lower receptacle 156 formed from transparent material. Thus, the amount of tabs 150 and other waste material collected in the receptacle 156 may be easily observed and, when full, the receptacle may be easily emptied.

With the foregoing description in mind, it will be apparent that the operation of the vacuum actuated rotary drill illustrated in Figures 5,7 is as follows:

With the rotatably driven drill retracted in its normal return position by the tension of the belt drive against the drill pulley wheel, the forward end of the housing 104 is placed in sealing contact against the rear surface of a vacuumboard of the like holding a sheet of photographic film F or the like thereon and a vacuum is applied to the housing 104 through conduit 132 from vacuum source 109. The vacuum is communicated through the rear vacuum chamber 120 of housing 104 to the hollow interior of the drill 131 through the open rear end thereof and thence through the borehole 130 in the drill bit to the forward vacuum chamber 129. In this manner, the sheet of film F is held tightly over aperture 108 in the vacuumboard 107 and the hollow drill is simultaneously urged into contact with the film by the atmospheric pressure operating against the surface of the drill sealing disc 124. As the drill assembly 102 simultaneously rotates and travels axially into contact with the film, the drill bit 140 cuts into the film, whereby the suction is destroyed and the tension of the drill driving belt 136 returns the drill assembly to its normal retracted position. The cut-out plug or tab 150 of film F is carried by the suction back through the hollow drill shaft, into and through rear vacuum chamber 120 and thence to vacuum conduit 132 to be collected in container 151.

The invention in its broader aspects is not limited to the specific embodiments herein shown and described but departures may be made therefrom within the scope of the accompanying claims without department from the principles of the invention and without sacrificing its chief advantages.

What is claimed is:

1. A vacuum actuated rotary drill for drilling pre-registered holes in a sheet of photographic film or the like, comprising, in combination:
   a housing member;
   a rotatably driven hollow drill having a cutting bit at one end thereof;
   means mounting said drill for rotation within said housing member and also for axial movement with respect to said housing member;
   air porous means at one end of said housing member through which said drill is adapted to protrude, said air porous means also providing a contact surface for said film;
   means yieldably restraining said drill against axial movement through said porous member; and
   means for applying suction to the interior of said housing and to the interior of said drill; whereby upon engagement of said porous member with said sheet of film, said film is drawn against said housing member and said rotary drill is also axially moved into cutting position with respect to said film, and after the cutting of said film has been accomplished, said drill is retracted and said film is released from said contact surface of said porous means.

2. A vacuum actuated rotary drill as claimed in claim 1, wherein the drill cutting but has a circumferentially extending cutting edge provided with identical, opposed concave portions, whereby the drill bit cuts with a shearing action at continuously moving points along the surface of the cutting edge.

3. A vacuum actuated rotary drill as claimed in claim 1, wherein
   said housing member includes an open front cavity and a rear vacuum chamber,
      said open front cavity carrying bearing means in which said drill is journalled for said rotation and said axial movement; and including
      sealing means secured to said drill in spaced relationship to said drill bit and in slidable sealing engagement with the wall of said front cavity, and
      sealing means at the forward end of said housing member adapted to provide a seal between said housing member and said film, whereby a front vacuum chamber is formed in said housing front cavity between said film and said drill sealing means; and wherein said drill includes aperture means at the opposite ends thereof communicating the hollow interior thereof with said front and rear vacuum chambers of said housing member, whereby said drill bit is drawn into cutting position with respect to said film by suction communicated to said front vacuum chamber.

4. A vacuum actuated rotary drill as claimed in claim 1, wherein said housing member includes a rear vacuum chamber, and including conduit means communicating a source of vacuum to said rear vacuum chamber, and wherein said hollow drill is open at its rear end and terminates within said rear vacuum chamber, whereby the cut-out portions of said film are sucked through said drill and said rear vacuum chamber into said conduit means; and including collecting means located in said conduit means for collecting said cut-out portions of said film.

5. A vacuum actuated rotary drill as claimed in claim 1, including a pulley wheel secured to said drill for rotation therewith, and motor-driven belt means for rotating said pulley wheel and said drill; and wherein said means yieldably restraining said drill against axial movement comprises means tensioning said belt means against a side of said pulley wheel.

* * * * *